United States Patent Office 2,877,978
Patented Mar. 17, 1959

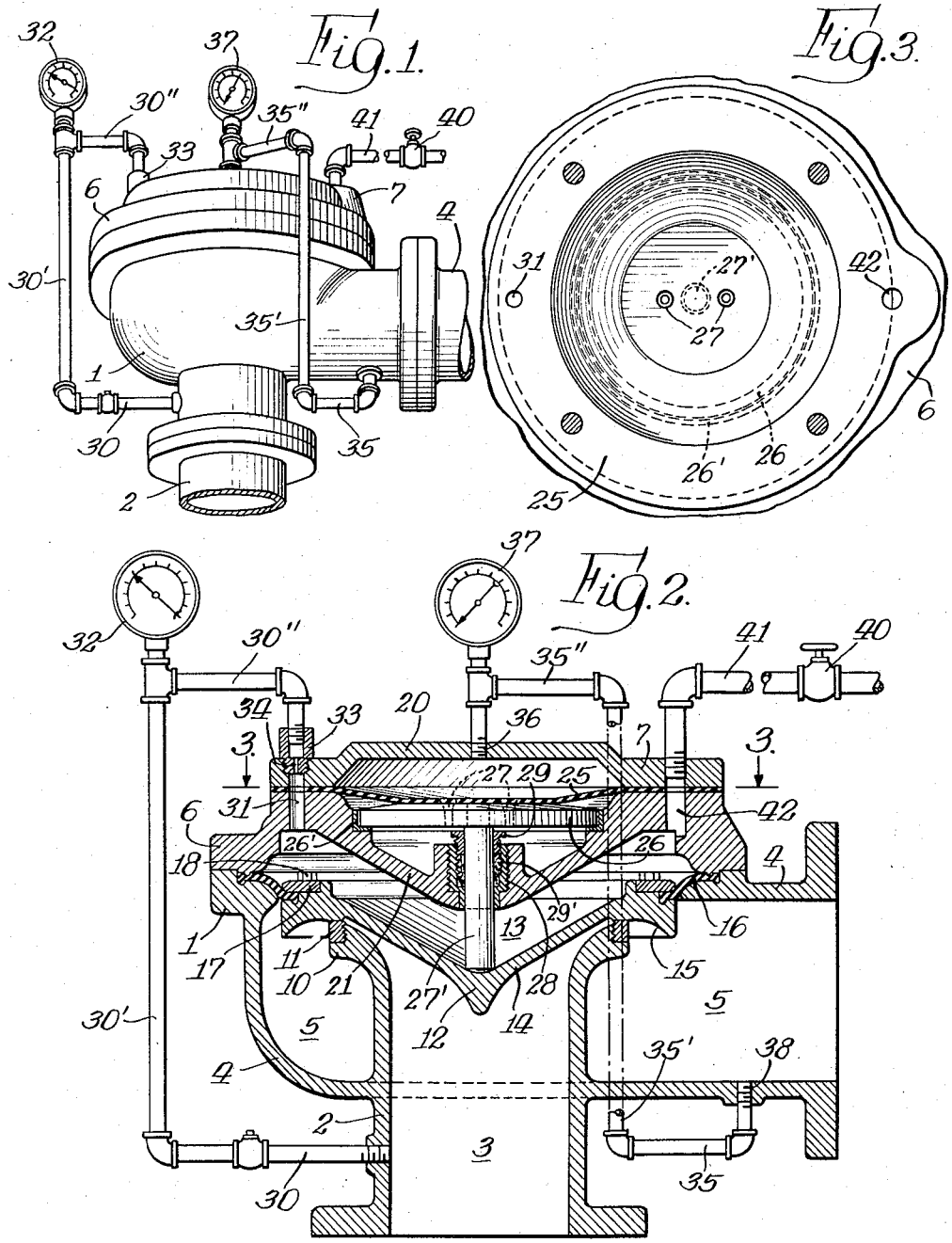

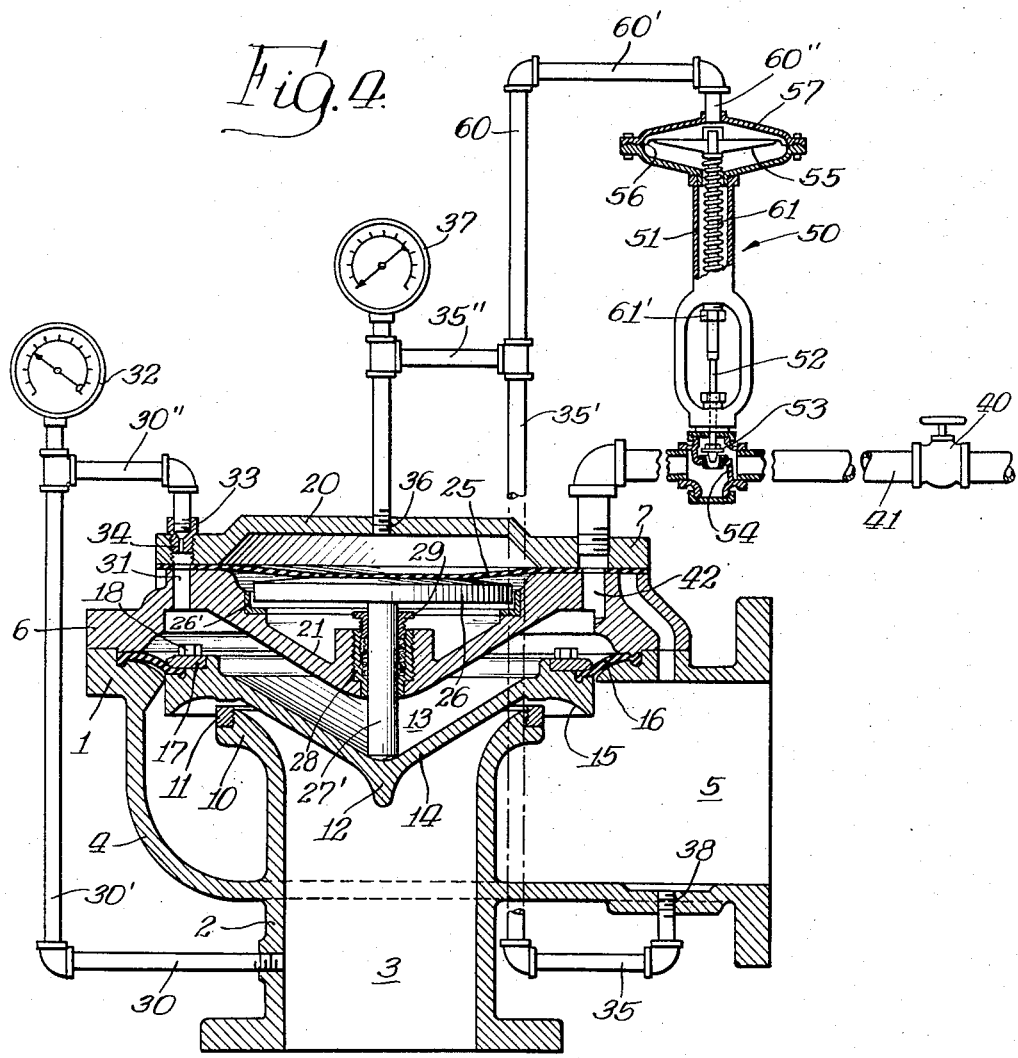

2,877,978

CONTROL VALVE

Frank A. Rider, Hastings, and Rozell P. Stanton, Middleville, Mich., assignors to The Viking Corporation, a corporation of Michigan Application March 29, 1954, Serial No. 419,323

7 Claims. (Cl. 251—46)

This invention relates to a control valve and, more particularly, to a control valve having mechanism operable at a remote location and utilizing the pressure of fluid passing therethrough for causing opening and closing of the valve.

An object of the invention is to provide a control valve which may be opened and closed by utilizing the pressure of fluid passing therethrough, from a remote position, without shutting off the flow of fluid to the valve.

Another object of the invention is to provide a control valve having an inlet passage terminating in a valve seat and an outlet passage, a valve member which is maintained against the valve seat to close off the inlet passage by fluid which is bypassed from the inlet passage, the valve member being permitted to open by venting of the fluid which is bypassed from the inlet passage, said fluid bypassed from the inlet passage acting, when not vented, in combination with means utilizing the velocity pressure of fluid bypassed from the outlet passage, to close the valve member.

Another object of the invention is to provide a control valve which may be opened and closed by utilizing the pressure of fluid passing therethrough, from a remote position, without shutting off the flow of fluid to the valve, and which may be controlled by a pilot valve responsive to discharge pressure to maintain a predetermined discharge pressure below inlet pressure.

Another object of the invention is to provide a control valve for controlling the flow of fluid between inlet and outlet passages having a casing provided with said passages, said casing having a compartment with a lower wall located above the inlet passage, a valve member disposed between said compartment and the termination of the inlet passage and having a valve seat formed by the termination of the inlet passage, a flexible annular member mounting the valve member for movement between open and closed positions, said valve member having a tapered conical form with its apex disposed axially in the inlet passage, conduit means connected between the inlet passage and the area between the lower wall of the compartment and the upper side of the valve member including a restriction therein for supplying fluid to said area which is at a pressure less than inlet pressure, a flexible member in the compartment dividing the compartment into upper and lower sections and having means carried on the underside thereof engageable with the valve member, said means comprising a cylindrical disc secured to the underside of the flexible member and having a vertically disposed pin passing through the lower wall of the compartment and into engagement with the upper side of the valve member, bypass conduit means connected between the outlet passage and the upper section of said compartment for directing the pressure of the fluid in the outlet passage against the flexible member whenever fluid is flowing through the outlet passage, manually operable means for selectively venting fluid from the area between the compartment and valve member to permit opening of the valve member by the pressure of fluid in the inlet passage, said last-named means, when closed, causing the build-up of pressure above the valve member which causes, in conjunction with the force transmitted through said pin and created by the pressure of fluid in the outlet passage, closing of the valve member.

The objects of the invention generally set forth, together with other ancillary advantages, are attained by the construction and arrangement shown by way of illustration in the accompanying drawing, in which:

Fig. 1 is a perspective view of the control valve device;

Fig. 2 is a vertical section of the control valve shown in Fig. 1; and,

Fig. 3 is a plan section taken along the line 3—3 in Fig. 2; and

Fig. 4 is a vertical section similar to Fig. 2 showing the control valve partially open and having mechanism for controlling discharge pressure.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

Our control valve, as shown in the drawing, comprises a casing 1 having a pipe 2 forming an inlet passage 3, and a pipe 4 forming an outlet passage 5 which surrounds the inlet pipe 2. The casing 1 also has plates 6 and 7 secured together and to the casing 1 by suitable means.

The inlet pipe 2 terminates in an outwardly flared end 10 provided with an annular brass element 11 forming a valve seat for a valve member 12. The valve member 12 has an upper side or wall 13 and a lower wall 14 which are downwardly and inwardly tapered to form a valve member having a generally conical form. The apex of the valve member is disposed axially of the inlet passage 3. The peripheral extremity of the valve member 12 is provided with a downwardly concaved surface 15 which is beyond the limits of the valve seat and which acts when the valve member is opened to direct the flow of fluid, which may be either liquid or gas, smoothly from the inlet passage 3 into the outlet passage 5 and also to aid in holding the valve member in its open position.

The valve member 12 is mounted to the casing for movement therein between opened and closed positions by a flexible annular member 16 having its outer portion secured between the main part of the casing 1 and the plate 6. The inner portion of the flexible member 16 is secured to the edge of the valve member 12 by means of an annular clamping plate 17 which is secured to the valve member by threaded bolts 18.

A compartment has its upper wall formed by a raised postion 20 of the plate 7 and the lower wall of the compartment is formed by a portion 21 of the plate 6. The lower wall 21 of the compartment with the upper side 13 of valve member 12 forms a fluid-receiving area. The lower wall 21 is tapered downwardly and inwardly to give the wall a conical form similar to that of the valve member 12. The apex of the lower wall 21 is located above the apex of the valve member 12 as well as the inlet passage and disposed axially thereof.

A flexible diaphragm member 25 is secured between plates 6 and 7 and divides the upper compartment into upper and lower sections. This diaphragm is in contact with cylindrical disc 26 for the purpose of transmitting pressure to valve member 12 through cylindrical rod 27'. Openings 27 are for adjustment of a threaded packing gland member 29. The disc seats in an annular L-shaped element 26' fitted in the plate 6. The disc 26 has a cylindrical pin or rod 27' secured thereto and extending downwardly therefrom which passes through the lower wall 21 in the plate 6 and into engagement with the upper side of the valve member 12. A stuffing box comprising threaded members 28 and 29 and packing 29' effects a fluid-tight seal between the area beneath the lower wall 21 and the compartment in the control valve. The disc 26 and pin 27' are capable of vertical movement in response to downward movement of the diaphragm 25 and upward movement of the valve member 12.

By-pass pipes 30, 30' and 30" connect the inlet pipe 2 with an opening 31 formed in plates 6 and 7 which terminates in the area formed by the upper side of the valve member 12 and the lower wall 21. A suitable gauge 32 may be connected in the pipe system 30 to indicate the pressure of the fluid in this conduit. A threaded member 33 fits in the opening 31 and connects the pipe system 30 to the casing. This member 33 has its lower end formed with a restricted opening 34 so that the pressure in the area above the valve member 12 will be at a pressure less than that of the fluid in the inlet passage 3 when valve 40 is open. The pressure in this area acting on the entire diameter of the valve member 12 is sufficient to hold the valve member closed against the pressure in the inlet passage 3 acting on a smaller area of the valve member when valve 40 is in set position.

By-pass pipes 35, 35' and 35" connect the outlet pipe 4 through an opening 38 with the upper section of the compartment through an opening 36 in the raised portion 20 of the plate 7. A suitable gauge 37 to indicate the pressure may be placed in the pipe system 35.

The area immediately above the valve member 12 may be selectively vented under the control of a manually-operated valve 40 in a pipe 41 which communicates therewith through an opening 42 in the plates 6 and 7. This valve need not be contiguous to the casing 1 but may be in any desired location.

In operation of the control valve, the fluid by-passed from the inlet passage 3 through the pipe system 30 into the area above the valve member 12 will be at a pressure same as inlet pressure and will positively hold or maintain the valve member in a closed position against the valve seat because of the differential areas on the upper and lower sides of the valve member 12. When it is desired to open the valve member 12 to permit flow of fluid from the inlet passage 3 to the outlet passage 5, the manually-operated valve 40 may be opened which rapidly vents fluid and pressure from the area immediately above the valve member 12 because of restricted member 33 and, as a result, permits the pressure of the fluid in the inlet passage 3 to raise the valve member and cause flow of fluid through the control valve. When fluid flows through the outlet passage 5, the pressure thereof will be transmitted through the by-pass pipe system 35 into the upper section of the compartment in the control valve. This will, through the diaphragm 25, disc 26 and pin 27, direct a force against the valve member. This force is not in and of itself sufficient to cause closing of the valve member 12. When closing of the valve member 12 is desired, the manually operated valve 40 is moved to closed position to close the pipe 41 and stop the venting of fluid from the area immediately above the valve member 12. Thus, the pressure in the last-referred to area plus the force exerted through the pin 27 is sufficient to cause closing of the valve member 12 against the pressure of fluid in the inlet passage 3.

Once the valve member 12 is closed, there will be no pressure in the upper section of the compartment. However, the holding pressure acting directly against the valve member 12 is sufficient to maintain the valve member in a closed position.

The discharge pressure through outlet passage 5 may be controlled to be either substantially equal to fluid pressure in inlet 3 or some lesser amount by the adjustment of the manually operated valve 40 which controls the rate at which fluid is vented from the area immediately above the valve member 12. Partial closing of the manually operated valve 40 will reduce the flow of fluid from the area immediately above valve member 12 to cause an increase in pressure in said area acting to partially close the valve member 12. The partial closure of the valve member 12 will result in reduced flow and pressure in the outlet passage 5.

The control of discharge pressure may be automatically controlled in the manner shown in Fig. 4 wherein a pilot valve is connected in the pipe 41 and is connected to the pipes leading from the outlet passage 5.

The control valve is the same in Figs. 2 and 4 except that in Fig. 4 the valve member 12 is shown in partially open position and out of engagement with the valve seat 10 so that fluid entering the inlet 3 will pass out through the outlet passage 5. Similar parts in both figures have been given the same reference numerals.

The pilot valve 50 comprises a casing or housing 51 in which is mounted a stem 52 having a clapper 53 at its lower end which seats in a valve seat 54. The valve stem 52 has a cylindrical disc 55 secured to the upper end of the housing 51 by an annular diaphragm 56. The upper end of the housing 51 has a fluid receiving area defined by the disc 55 and an upper wall 57 of the housing which is connected to the pipe 35' by additional pipes 60, 60' and 60". A spring 61 normally urges the disc 55 and the valve clapper 53 upwardly to maintain the clapper 53 out of engagement with the valve seat 54.

The force of the spring 61 may be adjusted by a threaded nut 61' in order to set the pilot valve for the maximum discharge pressure desired in the outlet passage 5.

In operation of the control valve, the valve clapper 53 of the pilot valve will be open so that opening of the manually operated valve 40 will permit venting of fluid from the area immediately above the valve member 12. This will cause fluid to flow through the outlet passage 5 and pressure will be transmitted through the pipe system 35 as well as the pipe system 60 against the pilot valve disc 55. The spring 61 will be adjusted to keep the clapper 53 open until a certain pressure in the outlet passage 5 is exceeded. If the discharge pressure exceeds that certain pressure determined by adjustment of the spring 61, downward movement of the disc 55 will occur which will, through the stem 52, cause a closing movement of the valve clapper 53 to reduce flow in the pipe 41. This will result in a partial closing of the valve member 12 and cause reduction in the volume and pressure at the outlet passage 5 to the desired amount as determined by the setting of the pilot valve 50. After the reduction of volume and pressure, the pressure on disc 55 will be reduced and the clapper 53 will be opened further to increase the flow in pipe 41. If this causes the pressure in the outlet passage 5 to exceed the certain pressure desired, the disc 55 will again be urged downwardly to reduce the flow in pipe 41.

We claim:

1. A control valve for controlling the flow of fluid between inlet and outlet passages comprising, in combination, a casing having an inlet passage terminating in an outwardly flared seat for the valve member, an outlet passage surrounding the inlet passage and communicating with the inlet passage, a compartment located above the seat and having a conical lower wall with its apex located above the inlet passage, a valve member being tapered in substantially conical form with its apex disposed axially in the inlet passage and in line with the apex of said lower wall, the other side of the valve member also being tapered to form an upper surface for the valve member similar in shape to that of said lower wall, a flexible annular member mounting the valve member to the casing for movement between an open position away from the valve seat and a closed position in engagement with the valve seat, conduit means connected between the inlet passage and the area between said lower wall and the upper wall of the valve member including a restriction therein for supplying fluid under pressure same as inlet pressure to said area and sufficient to maintain the valve member in closed position, a flexible diaphragm member in said compartment dividing the compartment into upper and lower sections and having means adjacent the under side thereof and engageable with said valve member to aid in closing of the valve member, said means comprising a disc in contact with the under side of the flexible diaphragm member and having a vertically disposed pin secured thereto and passing through said lower wall and in engagement with the upper wall of the valve member, conduit means connected between the outlet passage and the upper section of said compartment for directing outlet fluid pressure against the upper side of said flexible member whenever fluid is flowing through the outlet passage, and manually operable means connected by pipe means to the area immediately above the valve member for selectively venting fluid therefrom to permit opening of the valve by pressure in the inlet passage acting against the underside of the valve member, said last-named means when closed causing a build-up of pressure above the valve member which causes closing of the valve member, in conjunction with the force transmitted through said pin.

2. A control valve for controlling the flow of fluid between inlet and outlet passages comprising, in combination, a casing having an inlet passage terminating in an outwardly flared seat for the valve member, an outlet passage surrounding the inlet passage and communicating with the inlet passage, a compartment located above the seat and having a conical lower wall with its apex located above the inlet passage, a valve member being tapered in substantially conical form with its apex disposed axially in the inlet passage and in line with the apex of said lower wall, the other side of the valve member also being tapered to form an upper surface for the valve member similar in shape to that of said lower wall, means mounting the valve member to the casing for movement between an open position away from the valve seat and a closed position in engagement with the valve seat, conduit means connected between the inlet passage and the area between said lower wall and the upper wall of the valve member including a restriction therein for supplying fluid under pressure same as inlet pressure to said area and sufficient to maintain the valve member in closed position, a flexible diaphragm in said compartment dividing the compartment into upper and lower sections and having means adjacent the under side thereof and engageable with said valve member to aid in closing of the valve member, said means including a vertically disposed pin passing through said lower wall and in engagement with the upper wall of the valve member, conduit means connected between the outlet passage and the upper section of said compartment for directing outlet fluid pressure against said diaphragm whenever fluid is flowing through the outlet passage, and a manually operable valve for selectively venting fluid from the area above the valve member to release pressure from the top of the valve member and permit opening movement of the valve member, said manually operable valve, when closed, causing a build-up of pressure above the valve member which acts with the force transmitted through said pin in response to pressure in the outlet passage to cause closing of the valve member.

3. A control valve for controlling the flow of fluid between inlet and outlet passages comprising, in combination, a casing having an inlet passage terminating in a seat for the valve member, an outlet passage surrounding the inlet passage and communicating with the inlet passage, a compartment located above the seat and having a lower wall located above the inlet passage, a valve member disposed axially in the inlet passage, means mounting the valve member to the casing for movement between an open position away from the valve seat and a closed position in engagement with the valve seat, means extending externally of the casing and connected between the inlet passage and the area between said lower wall and the upper side of the valve member for supplying fluid under pressure same as inlet pressure to said area and sufficient to maintain the valve member in closed position, a diaphragm in said compartment dividing the compartment into upper and lower sections and having means adjacent the underside thereof and engageable with said valve member to aid in closing of the valve member, said means comprising a cylindrical disc in contact with the underside of the flexible member and having a vertically disposed pin secured thereto and passing through said lower wall and in engagement with the upper side of the valve member, conduit means connected between the outlet passage and the upper section of said compartment for directing outlet fluid pressure against the upper side of said diaphragm whenever fluid is flowing through the outlet passage, and manually operable means connected by pipe means to the area above the valve member for selectively venting fluid therefrom to permit opening of the valve member, said last-named means when closed causing a build-up of pressure above the valve member which is not alone sufficient to cause closing of the valve member but which causes, in conjunction with the force transmitted through said pin in response to the pressure of the fluid in the outlet passage, closing of the valve member.

4. A control valve comprising, a casing having an inlet passage, an outlet passage communicating with the inlet passage, a valve member mounted in the casing for movement between an open position and a closed position with reference to said inlet passage, a compartment having a lower wall located above the valve member, conduit means connected to the inlet passage for directing the full pressure of fluid in the inlet passage against the upper side of the valve member, said valve member having a larger effective area on its upper side exposed to inlet pressure than the area on its bottom side exposed to inlet pressure when the valve member is in closed position for holding the valve member in closed position against the pressure of fluid in the inlet passage, selectively operable means for venting the said pressure acting against the upper side of said valve member to permit opening of the valve member, a flexible diaphragm in said compartment dividing the compartment into upper and lower sections, means mounted in the lower portion of said compartment to be engaged by said diaphragm and having a stem projecting through said lower wall in fluid-tight relationship to bear on said valve member to urge the valve member toward closed position, and conduit means connected between the outlet passage and the upper section of said compartment for directing outlet fluid pressure against said diaphragm to aid in closing said valve member against the pressure of fluid in the inlet passage.

5. In a control valve having an outlet passage, a valve member for closing off an inlet passage, means utilizing the pressure of fluid in the inlet passage to create a holding pressure acting against the upper side of the valve member for holding the valve member in a closed position and means for venting said holding pressure to permit opening of the valve member and causing flow of fluid from the inlet to the outlet passage, the improvement which comprises diaphragm means arranged in spaced relation above the valve member and isolated from the pressure of fluid in the inlet passage, means bearing on said valve member and adapted to be engaged by said diaphragm means whereby the diaphragm means may urge said valve member toward closed position, and conduit means for directing the full pressure of fluid in said outlet passage against the upper side of said diaphragm to aid in closing the valve member against the pressure of fluid in the inlet passage, said valve member being caused to move to closed position when said venting means is moved to closed position to effect a build-up of said holding pressure.

6. A control valve having an inlet passage, an outlet passage, a valve seat between the inlet and outlet passages, a valve member movable toward the valve seat to a valve closed position and movable away from the valve seat to valve open positions, said valve member having one side facing toward the valve seat and inlet passage and an opposite side facing in the opposite direction, conduit means connected to the inlet passage for constantly directing the pressure of fluid in the inlet passage against said opposite side of the valve member, said valve member having a larger effective area on said opposite side exposed to inlet pressure than the area on said one side exposed to inlet pressure when the valve member is in closed position so that inlet pressure is effective for holding the valve member in closed position against the pressure of fluid in the inlet passage, selectively operable means for venting said pressure acting against said opposite side of the valve member to permit opening of the valve member by pressure of fluid in the inlet passage, fluid operable valve closing means operable against said opposite side of the valve member for urging the valve member toward a closed position against the pressure of fluid in the inlet passage, and conduit means constantly connecting said outlet passage and said fluid operable valve closing means for conducting fluid under pressure from the outlet passage to the fluid operable means, said fluid operable means acting in conjunction with the holding pressure on said opposite side of the valve member so that combined inlet pressure and outlet pressure are effective to close the valve member when said venting means is closed.

7. A control valve, comprising, a casing having an inlet passage, an outlet passage communicating with the inlet passage, a valve member mounted in the casing for movement in one direction toward valve open positions and in the opposite direction toward valve closed position with reference to the inlet passage, said valve member being mounted with one side thereof exposed to fluid pressure in the inlet passage constantly acting in said one direction to urge the valve member toward valve open positions, means utilizing the pressure of fluid in the inlet passage to constantly provide a holding pressure acting in said opposite direction against the valve member sufficient to hold the valve member in said closed position against the pressure of fluid in the inlet passage, valve means for venting the holding pressure acting against the valve member to permit opening of the valve member by pressure of fluid in the inlet passage, and means constantly transmitting to the valve member the pressure of fluid in the outlet passage for constantly urging the valve member in said opposite direction toward said closed position against the pressure of fluid in the inlet passage, said last recited means acting in conjunction with said holding pressure, and being effective when flow through said vent means is reduced, to move the valve member toward said valve closed position.

References Cited in the file of this patent
UNITED STATES PATENTS

| | | |
|---|---|---|
| 629,789 | Hoinball | Aug. 1, 1899 |
| 2,098,696 | Sparrow | Nov. 9, 1937 |
| 2,148,383 | Tyden | Feb. 21, 1939 |
| 2,155,170 | Odend'hal | Apr. 18, 1939 |
| 2,600,073 | Plank | June 10, 1952 |

FOREIGN PATENTS

| | | |
|---|---|---|
| 21,543 | Great Britain | of 1894 |